May 9, 1933.     B. M. MILLS     1,908,163
CONTROL SYSTEM
Filed Dec. 10, 1931
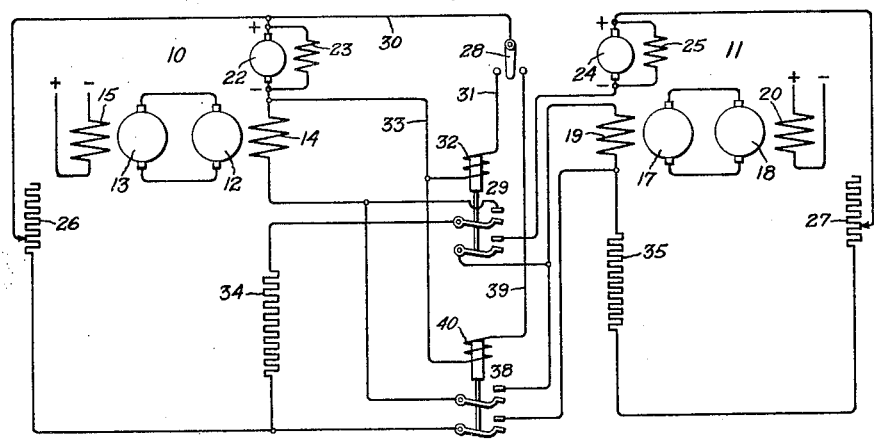
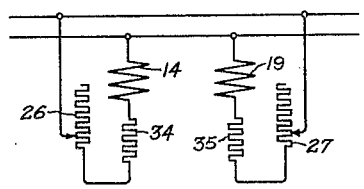
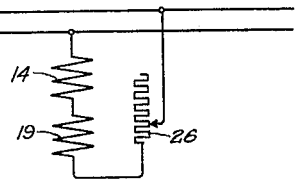
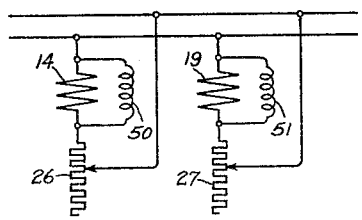
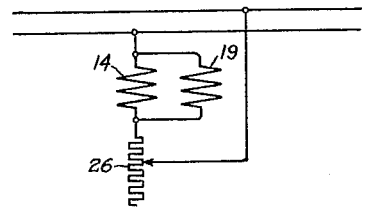
Inventor:
Bruce M. Mills,
by Charles A. Tullar
His Attorney.

Patented May 9, 1933

1,908,163

UNITED STATES PATENT OFFICE

BRUCE M. MILLS, OF SCHENECTADY, NEW YORK, ASSIGNOR TO GENERAL ELECTRIC COMPANY, A CORPORATION OF NEW YORK

CONTROL SYSTEM

Application filed December 10, 1931. Serial No. 580,166.

My invention relates to variable voltage control systems of the Ward-Leonard type and more particularly to a plurality of generators arranged under certain conditions jointly to supply a single load and under other conditions to supply individual loads, and has for an object the provision of a simplified system of this character having improved operating characteristics.

While my invention is broadly applicable to a variety of uses, it is particlarly advantageous for use in oil well drilling equipment. In oil well drilling, the skill of the operator plays an important part and it is essential that he shall know the response that can be obtained for a given setting of the field rheostat. For example, if it is desired to operate the hoisting drive, it is desirable to connect two or more generators in parallel to supply the necessary power for hoisting. For other operations each generator may be connected to an individual load, therefore a further object of my invention is to provide for the individual operation of the several generators so that their volt-ampere characteristics shall be substantially the same as when the generators are jointly supplying power to a load.

In carrying out my invention in one form thereof, I provide for maintaining the resistance of the separately excited field circuits of a plurality of generators constant for a given setting of the field rheostat, whether the generators are supplying current to their respective motors with individual control by separate rheostats or whether they are connected jointly to supply power to a single load with joint control from one of the rheostats. More specifically, for a pair of generators I provide an auxiliary resistance in the field circuit of each generator having a value which is equivalent to the resistance of the field winding of the other generator. When the generators are connected jointly to supply power to a single drive, I provide for inserting the field winding of one generator in place of the auxiliary resistance, thereby obtaining the same volt-ampere characteristics on the generator for a given setting of the field rheostat.

For a more complete understanding of my invention, reference should now be had to the drawing in which Fig. 1 diagrammatically illustrates a control system embodying my invention; Figs. 2 and 3 illustrate in simplified form the connections of the field circuit of the generators shown in Fig. 1 for different conditions of operation; while Figs. 4 and 5 illustrate in simplified form a modification of my invention as applied to the field circuits of a pair of generators, the field windings of which are arranged to be connected in parallel.

Referring to the drawing, I have shown my invention in one form as applied to the Ward-Leonard drives 10 and 11. A generator 12 is connected in local circuit with a motor 13, the separately excited field windings 14 and 15 being arranged respectively to supply excitation for the generator 12 and the motor 13. Similarly, a generator 17 is connected in local circuit with a motor 18, the field windings 19 and 20 being arranged to supply excitation for the generator and motor. As shown the field windings 14 and 19 are respectively excited by means of an exciter 22 provided with self-excited field winding 23, and an exciter 24 similarly provided with a self-excited winding 25. It will be understood, of course, that the field windings of the generators may be excited through an auxiliary source of direct current supply instead of the exciters if it is so desired.

Assuming that it is desired to operate the Ward-Leonard sets 10 and 11 with each generator independently controlled by the field rheostats 26 and 27, the single pole double throw switch 28 will be operated to its left-hand position, thereby completing an energizing circuit for the contactor 29. This circuit may be traced from the positive side of the exciter 22, conductor 30, control switch 28, conductor 31, operating coil 32 of the contactor 29 and by conductor 33 to the other side of the exciter armature. The contactor 29 is thereupon operated to its closed position, thereby connecting the field winding 14 in series with a fixed resistance 34, equal to the resistance of the field winding 19, and a field rheostat 26. Similarly, through the lower contacts of the contactor 29 the field winding 19 of the generator 17 is connected in series with a fixed resistance 35 equal to the resistance of the field winding 14, a field rheostat 27 and the armature of the exciter 24. It will be understood that the voltage of the generators 12 and 17 may be independently controlled by adjusting the field rheostats 26 and 27 which in practice are usually reversing rheostats. It will also be understood that other auxiliary resistances may be inserted in the field circuits for purposes well known to the art. For this condition of operation the motors 13 and 18 may be respectively geared to separate loads such as to the hoisting mechanism and to a mud pump of an oil well drilling equipment.

Should it be desired, however, to operate the generators 12 and 17 jointly to supply power to a single load with a single control rheostat, the switch 28 will be operated to its right-hand position.

The closing of the switch 28 completes an energizing circuit for the contactor 38. This circuit may be traced from the positive side of the exciter 22 by conductor 30, control switch 28, conductor 39, operating coil 40 of the contactor 38 and by conductor 33 to the other side of the exciter 22. The contactor 38 is thereupon operated to its closed position to connect the field winding 19 in series with the field winding 14, the armature of exciter 22 and field rheostat 26, but leaving the resistances 34 and 35 out of this field circuit. It will be understood that the voltage of the generators 12 and 17 may thus be jointly and simultaneously controlled by adjusting the field rheostat 26.

For this condition of operation the motors 13 and 18 are mechanically connected to a single drive such as the hoisting mechanism of an oil well drilling equipment by means of suitable gearing or the like (not shown). It is to be understood, however, that a single hoisting motor could be used, it having a volt-ampere rating equal to the sum of the volt-ampere ratings of the generators so that the generators could be electrically connected with their armature circuits in parallel or series jointly to supply power to such single hoisting motor.

Therefore, for the two conditions of operation described, for a given setting of the field rheostats the voltage of the generators for a given value of armature current will be the same whether the generators are separately controlled or whether they are controlled by the single rheostat 26. This may be clearly seen by referring to Figs. 2 and 3. In Fig. 2 it will be observed that the field winding 14 is connected in series with the resistance 34 and the field rheostat 26 while the field winding 19 is connected in series with the resistance 35 and the field rheostat 27. These connections represent the first condition with each generator independently controlled by the respective rheostats 26 and 27.

For the second condition of operation, however, as represented by Fig. 3, the field windings 14 and 19 are connected in series with the field rheostat 26. Inasmuch as the resistance of the winding 19 is equal to the resistance 34, it will be observed that the series resistance of the circuit in Fig. 3 remains the same as the series resistances of each of the separate field circuits shown in Fig. 2. Therefore, for a given ampere load per generator, the same response is obtained from the generators 12 and 17 for a given setting of the field rheostat 26 as is obtained with individual control of each generator with the same setting of the field rheostats 26 and 27. In other words, the operating characteristics of each generator with joint operation of the generators are the same as with individual operation.

Now that the principle of my invention has been explained, its application to various combinations of connections of field circuits will be obvious to those skilled in the art. For example, if it be desired to take into account the time constants introduced due to the inductance of the field windings, it will be understood that instead of employing the non-inductive resistances 34 and 35, impedances may be used, each of which has the same reactance and resistance as the respective field windings 14 and 19. By so employing impedances, it will be seen that the time constants of the field circuits will remain substantially the same whether the generators are jointly controlled by a single rheostat or whether they are independently controlled by separate rheostats.

Referring now to Fig. 4, I have shown an impedance 50 connected in parallel with the field winding 14, and a second impedance 51 connected in parallel with the field winding 19. As before, the field rheostats 26 and 27 serve to control the excitation of the generator field windings when the generators are to be separately controlled However, when the generators are connected jointly to supply a single load, the field winding 19 is connected in parallel with the field winding 14, the field rheostat 26 controlling the excitation of these field windings.

While I have shown particular embodiments of my invention, it will be understood, of course, that I do not wish to be limited thereto, since many modifications may be made, and I therefore contemplate by the appended claims to cover any such modifications as fall within the true spirit and scope of my invention.

What I claim as new and desire to secure by Letters Patent of the United States, is,—

1. In a system of distribution, a plurality of generators having substantially similar operating characteristics, separately excited field windings therefor, a single control circuit including more than one of said field windings for one condition of operation, a single control means included in said circuit for simultaneously controlling the energization of more than one of said field windings for said one condition, additional control means for said field windings, means for connecting each of said field windings in individual circuits for another condition of operation each circuit including one of said control means, and means included in each individual circuit for rendering each individual circuit the electrical equivalent of said single control circuit.

2. In a system of distribution, a pair of similar generators, each of which is provided with a separately excited field winding, a rheostat, connections for connecting said windings in series with said rheostat for the joint control of the excitation of said generators, a second rheostat, a pair of resistances each having the same resistance as one of said field windings, and connections for connecting each field winding in circuit with a rheostat and a resistance so that each generator may be separately controlled through a circuit having the same equivalent resistance as for said joint operation of said generators.

3. In a system of distribution, a plurality of generators having substantially similar operating characteristics, separately excited field windings therefor, a rheostat for each of said generators, connections for connecting said windings in series with each other and with one of said rheostats for the joint control of the excitation of said generators, a plurality of resistances and means for connecting each of said field windings in series with one of said rheostats and sufficient of said resistances so that the resistance of each field circuit is equal to the resistance of said windings connected in series with one of said field rheostats.

4. In a system of distribution, a plurality of generators having substantially similar operating characteristics, separately excited field windings therefor, a rheostat for each of said generators, connections for connecting said windings in parallel with each other, and in series with one of said rheostats for the joint control of the excitation of said generators, a plurality of resistances, and means for connecting each of said field windings in series with one of said rheostats and in parallel with sufficient of said resistances so that the equivalent resistance of each field circuit is equal to the resistance of said windings when connected in parallel.

5. In combination, a plurality of dynamo-electric machines having substantially similar operating characteristics, a separately excited field winding for each machine, a control rheostat operable to control the excitation produced by said field windings, connections for connecting said field windings in circuit with said control rheostat for simultaneous control of the excitation of said machines, additional control rheostats, connections for connecting each of said field windings in circuit with one of said control rheostats, impedance means included in circuit with each of said rheostates for producing the same change in energization of a field winding for a given operation of its control rheostats as for a corresponding operation of said first-mentioned control rheostat.

6. In combination, a plurality of variable voltage drives each of which includes a generator and a motor, a field winding for each generator, connections for connecting said field windings in circuit with each other, a single control means for controlling simultaneously the energization of said field windings for one condition of operation, individual control means for separately controlling the energization of said field windings, connections for connecting each of said individual control means in circuit with a single field winding for another condition of operation, and means included in circuit with each of said individual control means for producing the same change in energization of a field winding for a given operation of an individual control means as for a corresponding operation of said single control means.

7. In a system of distribution, a pair of similar generators, each of which is provided with a separately excited field winding, a rheostat, connections for connecting said windings in series with said rheostat for the joint control of the excitation of said generators, a second rheostat, a pair of impedances each having the same impedance as one of said field windings and connections for connecting each field winding in circuit with a rheostat and an impedance so that each generator may be separately controlled through a circuit having the same equivalent impedance as for said joint operation of said generators.

In witness whereof, I have hereunto set my hand.

BRUCE M. MILLS.